United States Patent [19]

Roper

[11] Patent Number: 5,267,505
[45] Date of Patent: Dec. 7, 1993

[54] PISTON

[75] Inventor: Jeffrey Roper, Everdon, United Kingdom

[73] Assignee: Vickers PLC, United Kingdom

[21] Appl. No.: 919,614

[22] Filed: Jul. 24, 1992

Related U.S. Application Data

[63] Continuation of Ser. No. 623,743, Dec. 13, 1990, abandoned.

[30] Foreign Application Priority Data

May 6, 1989 [GB] United Kingdom ............... 8910473

[51] Int. Cl.$^5$ ................................................. F16J 1/04
[52] U.S. Cl. ..................... 92/208; 277/170; 123/193.4
[58] Field of Search ................ 277/168, 170, 189.5; 92/192, 208; 123/193.4, 193.6

[56] References Cited

U.S. PATENT DOCUMENTS

| | | | |
|---|---|---|---|
| 1,866,907 | 7/1932 | Reiland et al. | 277/170 X |
| 2,413,154 | 12/1946 | Porter | 92/208 |
| 2,550,879 | 5/1951 | Stevens, Jr. | 277/189.5 X |
| 2,845,917 | 8/1958 | Laubender | 123/193 P X |
| 2,915,348 | 12/1959 | Arnold et al. | |
| 3,104,594 | 9/1963 | Reiners | 277/189.5 X |
| 3,508,531 | 4/1970 | Squinto et al. | 92/208 X |
| 4,253,435 | 3/1981 | McCandless | 92/208 X |
| 4,346,685 | 8/1982 | Fujikawa | 277/170 X |

FOREIGN PATENT DOCUMENTS

| | | | |
|---|---|---|---|
| 225228 | 4/1943 | Switzerland | 123/193 P |
| 378469 | 7/1964 | Switzerland . | |
| 992775 | 1/1983 | U.S.S.R. | 123/193.4 |
| 930577 | 7/1963 | United Kingdom . | |
| 1096655 | 12/1967 | United Kingdom . | |
| 1294061 | 10/1972 | United Kingdom | 92/208 |
| 1413114 | 11/1975 | United Kingdom . | |
| 7900862 | 11/1979 | World Int. Prop. O. . | |

*Primary Examiner*—Edward K. Look
*Assistant Examiner*—F. Daniel Lopez
*Attorney, Agent, or Firm*—Klarquist Sparkman Campbell Leigh & Whinston

[57] ABSTRACT

A piston having a crown, a head land depending downwardly from the crown, a skirt and at least one groove between the head land and the skirt to receive a piston ring wherein the head land is provided with a part which has a greater cross-sectional dimension than any portion of the piston between said part and the skirt.

18 Claims, 3 Drawing Sheets

PISTON

This application is a continuation of application Ser. No. 07/623,743, filed on Dec. 13, 1990 now abandoned.

BACKGROUND OF THE INVENTION

This invention relates to a piston having a crown, a head land depending downwardly from the crown, a skirt and at least one groove between the skirt and the head land to receive a piston ring.

Typically, a plurality of lands, separated by grooves, are provided between the crown and the skirt. For example, the piston may have three lands, a head land next to the crown, an intermediate land and a bottom land next to the skirt, there being a first compression ring in a groove between the head and intermediate lands, a second compression ring in a grrove between the intermediate and bottom lands and an oil control ring in a groove between the bottom land and the skirt. However, a different number of lands may be provided, for example, there may be only a head land between the crown and skirt with a single groove therebetween with a single ring therein.

Hitherto such pistons have been made so that, in use at normal operating temperature, there is a clearance between the head land and a cylinder bore, in which the piston is used, which is greater than the clearance between the skirt and the cylinder. When the piston is cold the difference between the clearances is greater because there is a falling thermal gradient between the crown of the piston and the bottom of the skirt so that there is a greater extent of thermal expansion of the piston towards the crown.

As a result, the head land normally runs at relatively large clearances relative to the cylinder wall, for example at 0.40-1.00 mm diametral clearance with pistons having a diameter of about 50 mm-100 mm. This relatively large clearance is to ensure that contact with the cylinder bore is avoided throughout the thermal operating range of the piston as well as to avoid contact as a result of tipping of the piston which can occur, particularly when the engine is cold.

This relatively large clearance results in the following three disadvantages.

Even at maximum operating temperatures there is a "dead gas zone" in the clearance region between the head land and the cylinder bore which can lead to detonation and result in land burning and result in local melting of the land as well as damage to the top ring. Often breakage of both the land and the ring occurs. There is an increasing trend to operate internal combustion engines with lean mixtures for fuel economy and to reduce exhaust emissions, especially in engines having two valves per cylinder and this exacerbates the problem as the spark plug is located to one side of the cylinder and land burning occurs on the opposite side at the maximum distance from the spark plug.

The relatively large head land clearance exposes the top ring to combustion gases which can lead to ring collapse and reduced tension of the spring and higher than desired blow-by of gases which leads to reduced efficiency and contamination of the lubricating oil of the engine by the products of combustion.

There is a current trend to make pistons with a relatively high diameter to height ratio so that the length of the skirt available to support the piston is relatively small thus weight and minimising the area of the piston available for frictional restraint by the bore. As a result of the relatively large clearance provided between the head land and the cylinder bore there is a relatively great tendency for such pistons to tip, especially with so-called "slipper" designs, which have not only short skirt support areas, but also skirt support areas which are narrow in the thrust-trailing axis so allowing additional movement of the piston along the gudgeon pin axis and poor control.

SUMMARY OF THE INVENTION

An object of the invention is to provide a new and improved piston whereby the above mentioned disadvantages are overcome or are reduced.

According to one aspect of the present invention we provide a piston having a crown, a head land depending downwardly from the crown, a skirt and at least one groove between the head land and the skirt to receive a piston ring wherein the head land is provided with a part which has a greater cross-sectional dimension than any portion of the piston between said part and the skirt.

Said part may have said greater cross-sectional dimension at operating temperature.

Said part may have said greater cross-sectional dimension at ambient temperature.

The head land may comprise at least one peripherally extending rib which is of lesser width than the width of the head land.

According to another aspect of the present invention we provide a piston having a crown, a head land depending downwardly from the crown, a skirt and at least one groove between the head land and the skirt to receive a piston ring, wherein the head land is provided with a part having at least one peripherally extending rib which is of lesser width than the width of the head land.

Preferably, the head land comprises a plurality of parallel peripherally extending ribs spaced apart along the width of the head land. The head land may have three such ribs.

The rib or each rib may have a width lying in the range 0.5-1.0 mm. Where there is more than one rib the ribs may be spaced by a distance lying in the range 1.25-1.5 mm.

The outer i.e. cylinder bore adjacent surface of the rib or each rib may be tapered and when there is a plurality of ribs the outer surfaces of the ribs may lie on a common frusto-conical surface which decreases in diameter towards the crown of the piston.

Preferably, the piston has a plurality of lands, said part of the head land having a greater cross-sectional dimension at operating temperature than any part of the or each other land.

Where there are a plurality of lands the or, at least one of the, or each land other than the head land may be of constant cross-sectional dimension or may taper towards the crown of the piston.

BRIEF DESCRIPTION OF THE DRAWINGS

Preferably, the skirt and/or the or each land and/or the or each rib is circular in cross-section.

A piston embodying the invention will now be described by way of example with reference to the accompanying drawings wherein.

DESCRIPTION OF THE PREFERRED EMBODIMENT

Figure 1:
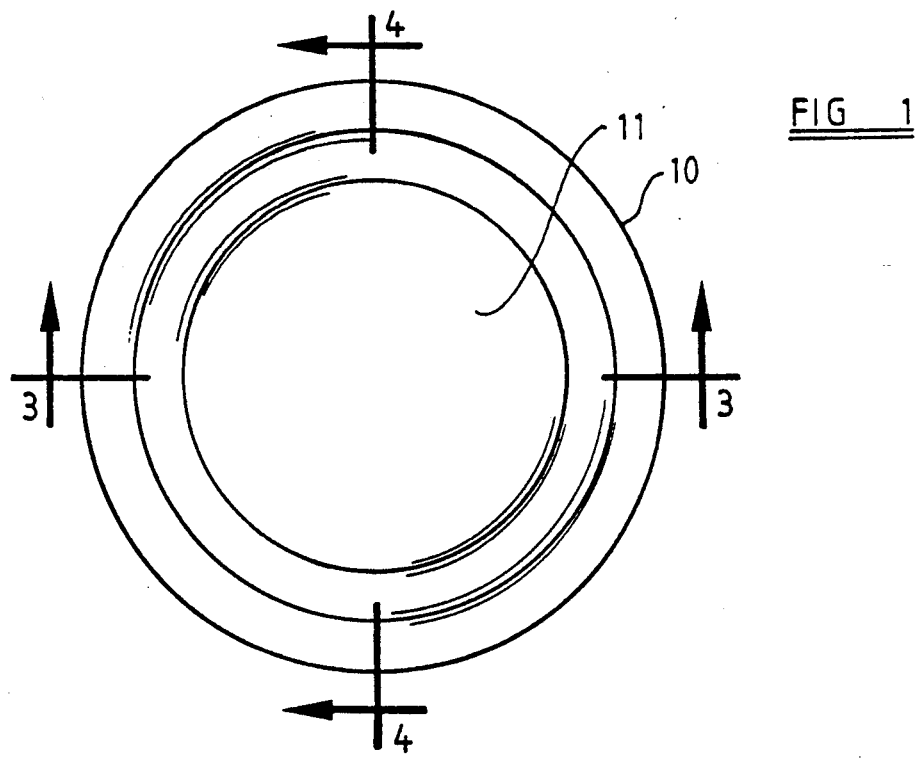
FIG. 1 is a plan view of a piston embodying the invention.
Figure 2:
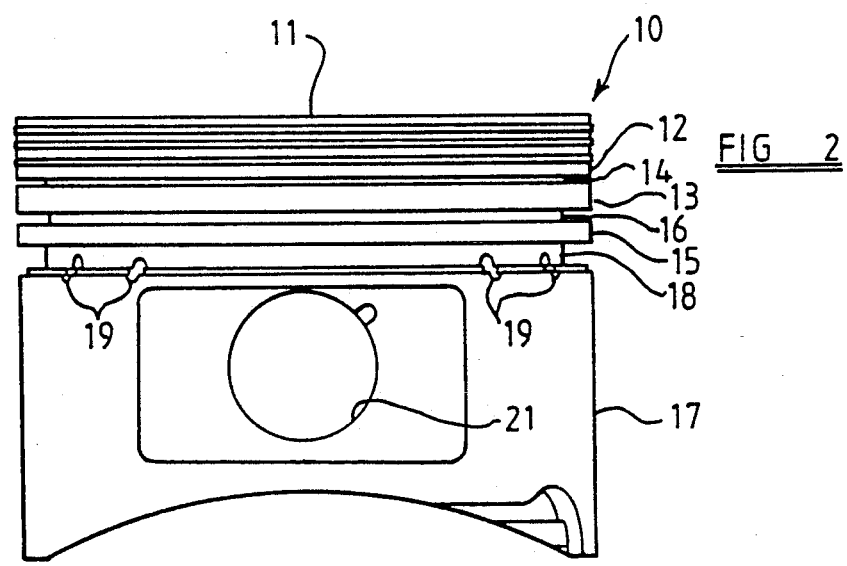
FIG. 2 is a side elevation of the piston of FIG. 1.
Figure 3:
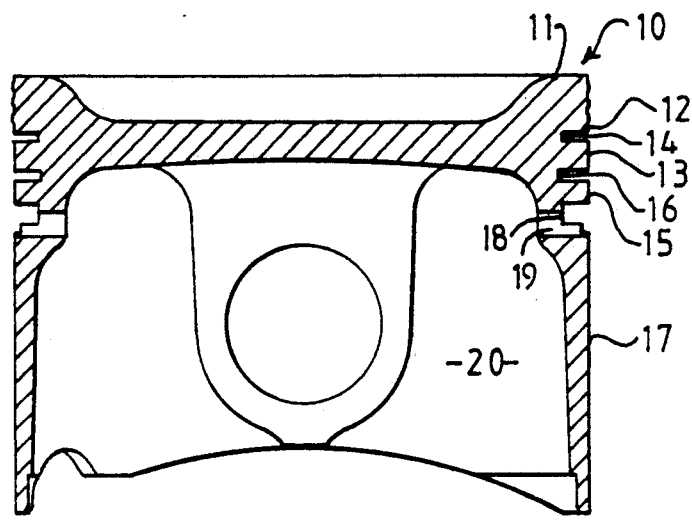
FIG. 3 is a section on the line 3—3 of FIG. 1.

Referring to the drawings, a piston 10 comprises a top wall or crown 11 from which a head land 12 depends downwardly. Below the head land 12 is intermediate land 13 separated from the head land 12 by a first groove 14 for a conventional compression piston ring, not shown. Below the intermediate land 13 is a bottom land 15 separated from the intermediate land 13 by a second groove 16 for a second compression piston ring, also not shown.

Below the bottom land 15 is a piston skirt 17 which is separated from the bottom land 15 by a third groove 18 to receive an oil control piston ring, also not shown. The groove 18 for the oil control ring is provided with a plurality of bores 19 which extend through the piston wall to a hollow interior 20 of the piston to permit passage of oil therethrough.

The piston is made in conventional manner and is provided with trunnions 21 for a conventional gudgeon pin to connect the piston to a connecting rod in conventional manner.

In this example the skirt 17 has a diameter of 78.000 mm at its bottom end and a diameter of 77.85 mm at its top end, the contour being a compound shape determined in accordance with the temperature gradient encountered in service.

The groove 18 has a diameter of 70.75 mm. The bottom land 15 has a diameter of 77.07 mm and is of constant diameter throughout its width. The groove 16 has a diameter of 70.10 mm whilst the land 13 has a diameter at its bottom end of 77.61 mm and is of frusto-conical configuration and the half angle of the frusto-conical surface being 0° 30. The groove 14 has a diameter of 70.90 mm. The head land 12 is of frusto-conical configuration having a surface which lies in a continuation of the frusto-conical surface in which the surface of the land 13 lies.

Formed integrally with the land 12 are three upstanding ribs 25, 26, 27 which extend circumferentially around the land 12 and are spaced apart by grooves 28, 29. The lowermost rib 27 at its lowermost part has a diameter of 77.64 mm. The topmost rib 25 has a diameter at its topmost part of 77.57 mm and the surfaces of the ribs 25, 26, 27 lie on a frusto-conical surface bounded by the above mentioned topmost part of the rib 25 and lowermost part of the rib 27. The ribs 25, 26, 27 are 0.75 mm wide and the above mentioned frusto-conical surface has a half angle of 0° 25'.

Figure 6:
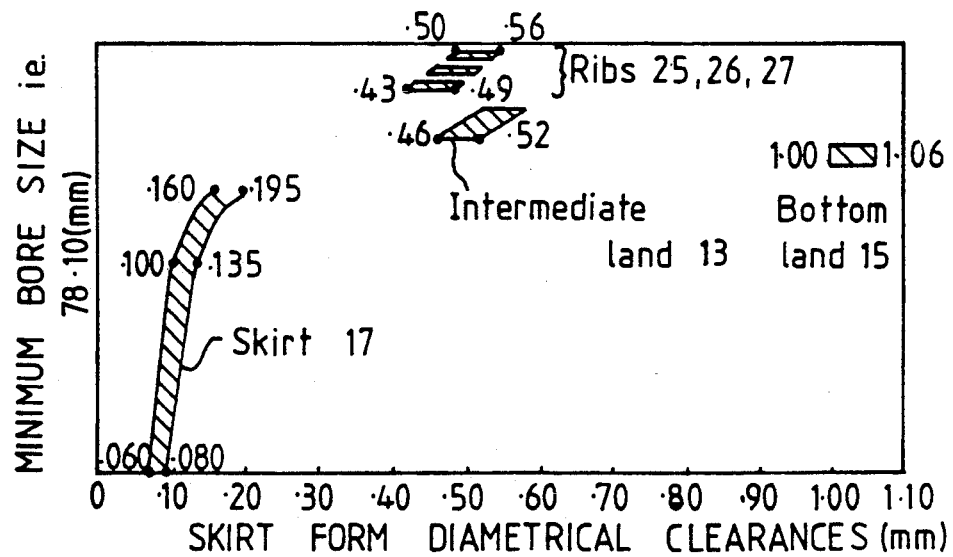
FIG. 6 is a graphical representation of piston to cylinder bore clearance in respect of the piston shown in FIGS. 1 to 5.

The above mentioned dimensions are when the piston is at ambient temperature and, of course, in practice the above mentioned dimensions are subject to the usual tolerances. When the piston is in use, then due to differential expansion between the top and bottom of the piston due to the temperature gradient arising from the fact that the top of the piston is subjected to a higher temperature than is the bottom of the piston, the head land and its associated ribs expand diametrically more than the parts of the piston therebelow and therefore the ribs 25, 26, 27 are closer to the wall of a co-operating cylinder bore than all portions of the piston between the ribs and the skirt 17. It is, of course, necessary that this condition obtains throughout the circumference of the ribs at working temperature and in practice slight wear takes place to establish the desired conformability and correct sliding clearance. The clearance obtained in practice at ambient temperature are shown in FIG. 6.

Figure 4:
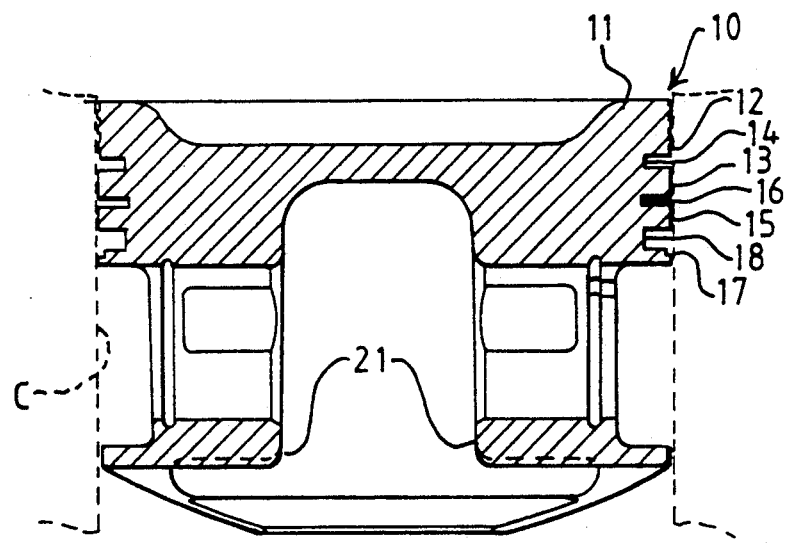
FIG. 4 is a section on the line 4—4 of FIG. 1.
Figure 5:
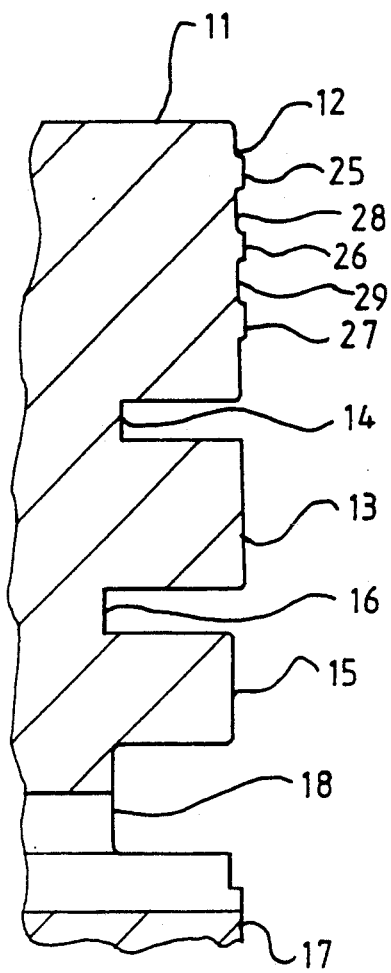
FIG. 5 is a part of FIG. 4 drawn to an enlarged scale.

The above mentioned specific dimensions are only given by way of example and are for a piston intended to fit in a cylinder bore C, see FIG. 4, of 78.11 mm diameter. If desired, the various parts of the dimensions mentioned above may be of other dimensions suitable for the particular application concerned and, for example, where a piston bore of the same diameter is concerned the respective parts may be of different dimensions depending upon the temperature gradient obtained in practice with any particular engine.

For example, the or each rib may have a width lying in the range 0.5–1.0 mm but where there is more than one rib the ribs may be spaced by a distance lying in the range 1.25–1.5 mm. The or each rib may have a height lying in the range 0.17–0.20 mm. Although in the above example a piston having three lands with three grooves for piston rings has been described, if desired the invention may be applied to pistons having a different number of lands including, for example, a piston having a single land separated by a single groove from the skirt.

Although in the above example the head land has been described as having three ribs, if desired the head land may be provided with more than three or less than three ribs including a single rib.

The invention also encompasses a piston in which the head land is formed without a discrete rib, of lesser width than the width of the land, but where the land is nevertheless formed so as to have a part which has throughout its circumference, at the operating temperature, a greater cross-sectional dimension than any portion of the piston between said part and the skirt. The above mentioned part may comprise the whole of the width of the head land or may comprise only a localised part thereof. For example, the head land may be of frusto-conical configuration with the larger diameter at or adjacent the crown end of the head land. Alternatively, the head land may be of bi-frusto-conical configuration and the pair of frusto-cones may be of the same or different half angle and the line of junction between the bases of the frusto-cones may be disposed at any desired position along the width of the head land. If desired, the head land may be of other configuration and may for example be of curvilinear shape in a section taken on a diametral plane of the piston.

The invention may be applied to pistons of any desired diameter, although it is particularly concerned with pistons having a diameter lying in the range 50 mm–120 mm.

A piston embodying the present invention has the advantages that there is a reduced "dead gap zone" between the head land and a cylinder bore by virtue of the provision of the at least one rib, thereby limiting the possibility of detonation in this zone.

The presence of the each rib protects the top ring from combustion gases so that the ring remains cleaner and suffers less from heat collapse. Where a plurality of ribs are provided blow-by is reduced due to the labrynth effect provided by the plurality of ribs and this has been found that flow-by has been reduced by as much as 50%.

In addition the provision of the at least one rib gives support at the gudgeon pin axis which is particularly valuable with slipper design pistons to prevent side tipping and reduce skirt loads and scuffing.

The piston described hereinbefore has been specifically designed for a spark ignition engine but the invention may be applied to pistons for other applications.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A piston comprising:
a crown;
a head land connected to and extending downwardly from the crown;
a skirt located downwardly from the head land; and
at least one groove between the head land and the skirt to receive a piston ring;
wherein the head land is provided with a part which has a greater cross-sectional dimension perpendicular to a longitudinal axis of the piston than any portion of the piston between said part and the skirt;
wherein the skirt has a greater cross-sectional dimension perpendicular to the longitudinal axis of the piston than said part; and
wherein said part of the head land comprises at least one peripherally extending rib which is of lesser width, in the direction of the longitudinal axis of the piston, than the width, in the direction of the longitudinal axis of the piston, of the head land.

2. A piston according to claim 1 wherein said one rib has a width, in the direction of the longitudinal axis of the piston, lying in the range 0.5-1.0 mm.

3. A piston according to claim 1 wherein there is more than one rib and the ribs are spaced from one another in the direction of the longitudinal axis of the piston, at a distance lying in the range 1.25-1.5 mm.

4. A piston according to claim 1 wherein said at least one rib has a height perpendicular to the longitudinal axis of the piston lying in the range 0.17-0.20 mm.

5. A piston according to claim 1 wherein said at least one rib has an outer surface which is adapted to be adjacent a cylinder bore for receiving the piston, and said outer surface is tapered.

6. A piston comprising:
a crown;
a head land connected to and extending downwardly from the crown;
a skirt located downwardly from the head land; and
at least one groove between the head land and the skirt to receive a piston ring;
wherein the head land is provided with a part which has a greater cross-sectional dimension perpendicular to a longitudinal axis of the piston than any portion of the piston between said part and the skirt;
wherein the skirt has a greater cross-sectional dimension perpendicular to the longitudinal axis of the piston than said part; and
wherein said part of the head land comprises a plurality of parallel peripherally extending ribs spaced apart along the width, in the direction of the longitudinal axis of the piston, of the head land.

7. A piston according to claim 6 wherein said part of the head land has three such ribs.

8. A piston comprising:
a crown;
a head land connected to and extending downwardly from the crown;
a skirt located downwardly from the head land; and
at least one groove between the head land and the skirt to receive a piston ring;
wherein the head land is provided with a part which has a greater cross-sectional dimension perpendicular to a longitudinal axis of the piston than ant portion of the piston between said part and the skirt;
wherein the skirt has a greater cross-sectional dimension perpendicular to the longitudinal axis of the piston than said part; and
wherein the head land comprises a plurality of peripherally extending ribs and the outer surfaces of the ribs lie on a common frusto-conical surface which decreases in diameter towards the crown of the piston.

9. A piston according to claim 8 wherein the skirt has a contour of compound shape having a smaller cross-sectional dimension at the end of the skirt closest to the crown of the piston than at the end of the skirt furthest from crown of the piston.

10. A piston for use in an internal combustion engine, the piston comprising:
a crown;
a head land connected to and extending downwardly from the crown;
a skirt located downwardly from the head land; and
at least one groove between the head land and the skirt to receive a piston ring;
wherein the head land is provided with a part which has a greater cross-sectional dimension perpendicular to a longitudinal axis of the piston than any portion of the piston between said part and the skirt;
wherein the skirt has a greater cross-sectional dimension perpendicular to the longitudinal axis of the piston than said part; and
wherein the piston has plural other lands, said part of the head land having a greater cross-sectional dimension, perpendicular to the longitudinal axis of the piston, and wherein at least one of said plural other lands has a constant cross-sectional dimension perpendicular to the longitudinal axis of the piston.

11. A piston according to claim 10 wherein said part and said skirt have said greater cross-sectional dimensions at room temperature.

12. A piston for use in an internal combustion engine, the piston comprising:
a crown;
a head land connected to and extending downwardly from the crown;
a skirt located downwardly from the head land; and
at least one groove between the head land and the skirt to receive a piston ring;
wherein the head land is provided with a part which has a greater cross-sectional dimension perpendicular to a longitudinal axis of the piston than any portion of the piston between said part and the skirt;

wherein the skirt has a greater cross-sectional dimension perpendicular to the longitudinal axis of the piston than said part; and wherein the piston has a plurality of lands there being no other land between said head land and said crown, said part of the head land having a greater cross-sectional dimension, perpendicular to the longitudinal axis of the piston.

13. A piston according to claim 12 wherein there are a plurality of lands and at least one land other than the head land tapers toward the crown of the piston.

14. A piston according to claim 12 wherein said part and said skirt have said greater cross-sectional dimensions at room temperature.

15. A piston comprising:

a crown;

a head land connected to and extending downwardly from the crown;

a skirt located downwardly from the head land; and at least one grove between the head land and the skirt to receive a respective piston ring, there being no groove between said head and said crown;

wherein the head land is provided with a part which has a greater cross-section dimension perpendicular to a longitudinal axis of the piston than any portion of the piston between said part and the skirt; and wherein the skirt has a greater cross-sectional dimension perpendicular to the longitudinal axis of the piston than said part.

16. A piston according to claim 15 wherein said part and the skirt have said greater cross-sectional dimensions at room temperature.

17. A piston according to claim 15 wherein at least one selected from the group comprising the skirt, the head land and said part is circular in cross-section.

18. A piston according to claim 15 wherein the piston is a slipper piston.

* * * * *

UNITED STATES PATENT AND TRADEMARK OFFICE
CERTIFICATE OF CORRECTION

PATENT NO. : 5,267,505

DATED : December 7, 1993

INVENTOR(S) : Jeffrey Roper

It is certified that error appears in the above-identified patent and that said Letters Patent is hereby corrected as shown below:

Column 1, line 18, "grrove" should be --groove--.
Column 1, line 68, "thus weight" should be --thus saving weight--.
Column 2, line 39), "lands. The" should be --lands. {new ¶} The--.

Column 3, line 31, "78.000" should read --78.030--.
Column 3, line 42, "30." should read --30'.--.

In the Claims:

Column 6, line 2, "piston. of the head" should be --piston, of the head--.
Column 6, line 14, "ant" should be --any--.

UNITED STATES PATENT AND TRADEMARK OFFICE
CERTIFICATE OF CORRECTION

PATENT NO. : 5,267,505
DATED : December 7, 1993
INVENTOR(S) : Jeffrey Roper

It is certified that error appears in the above-indentified patent and that said Letters Patent is hereby corrected as shown below:

Column 8, line 3, "said head and" should be --said head land and--.

Signed and Sealed this

Eighteenth Day of October, 1994

Attest:

BRUCE LEHMAN

Attesting Officer    Commissioner of Patents and Trademarks